US007134618B2

(12) United States Patent
Harutyunyan et al.

(10) Patent No.: US 7,134,618 B2
(45) Date of Patent: Nov. 14, 2006

(54) DRY POWDER INJECTOR

(75) Inventors: Avetik Harutyunyan, Columbus, OH (US); Shoji Isobe, Dublin, OH (US)

(73) Assignee: Honda Motor Co., Ltd, Tokyo (JP)

( * ) Notice: Subject to any disclaimer, the term of this patent is extended or adjusted under 35 U.S.C. 154(b) by 203 days.

(21) Appl. No.: 10/727,706

(22) Filed: Dec. 3, 2003

(65) Prior Publication Data
US 2005/0121545 A1    Jun. 9, 2005

(51) Int. Cl.
*B05B 7/14* (2006.01)
(52) U.S. Cl. ............... 239/654; 239/650; 239/693; 239/708; 222/318; 222/424; 406/118; 406/134
(58) Field of Classification Search ........... 222/199, 222/200, 318, 399, 424; 239/124, 125, 654, 239/693, 697, 708; 406/89, 90, 93, 118, 406/122, 134, 138, 141, 142, 181
See application file for complete search history.

(56) References Cited

U.S. PATENT DOCUMENTS

| | | | | | |
|---|---|---|---|---|---|
| 3,558,052 | A | * | 1/1971 | Dunn | 239/3 |
| 3,746,254 | A | * | 7/1973 | Duncan et al. | 239/697 |
| 4,116,367 | A | * | 9/1978 | Kataoka et al. | 222/144.5 |
| 4,561,808 | A | * | 12/1985 | Spaulding et al. | 406/118 |
| 4,863,316 | A | * | 9/1989 | Gianella et al. | 406/14 |
| 4,900,199 | A | * | 2/1990 | Spaulding et al. | 406/14 |
| 5,056,720 | A | | 10/1991 | Crum et al. | |
| 5,145,293 | A | * | 9/1992 | Savino et al. | 406/193 |
| 5,279,854 | A | * | 1/1994 | Kendall et al. | 427/197 |
| 5,727,732 | A | * | 3/1998 | Stein | 239/1 |

FOREIGN PATENT DOCUMENTS

EP    0297452 A1    1/1989

OTHER PUBLICATIONS

Bohnet, Matthias, "Calculation and Design of Gas/Solid-Injectors", Powder Technology, 1984, pp. 302-313.
Cheng, Y.-S. et al., "A Venturi Disperser as a Dry Powder Generator for Inhalation Studies", Inhalation Toxicology, vol. 1, No. 4, 1989, pp. 365-371.
Drew, Robert et al., "A New Dust-Generating System for Inhalation Studies", American Industrial Hygiene Association Journal, vol. 32, No. 5, May 1971, pp. 327-330.
Ebens, Rinze et al., "Device for Continuously Metering Small Amounts of Dust*)", Staub-Teinhalf der Luft, vol. 28, No. 5, May 1968, p. 197.
Wright, B. M. et al., "A New Dust-Feed Mechanism", vol. 27, Jan. 1950, pp. 12-15.

* cited by examiner

*Primary Examiner*—Justine R. Yu
*Assistant Examiner*—Jason Boeckmann
(74) *Attorney, Agent, or Firm*—Mark Duell; Narinder Banait; Fenwick & West, LLP

(57) ABSTRACT

Methods, processes, and apparatuses for the large scale synthesis of carbon nanostructures are provided. Metal catalysts having small diameter and narrow distribution of particle sizes are prepared and continuously injected as aerosols into a reactor. The metal catalysts are supported on supports that are substantially free of carbon. The metal catalyst, in the form of a powder, is placed in an injector that is shaken vertically. The powder is aerosolized, and the powder entrailed in the gas is passed through a conduit that is bifurcated where one portion delivers the powder to the reactor while the other portion connects back to the ejector that is located in between the gas source and the top part of the container.

11 Claims, 1 Drawing Sheet

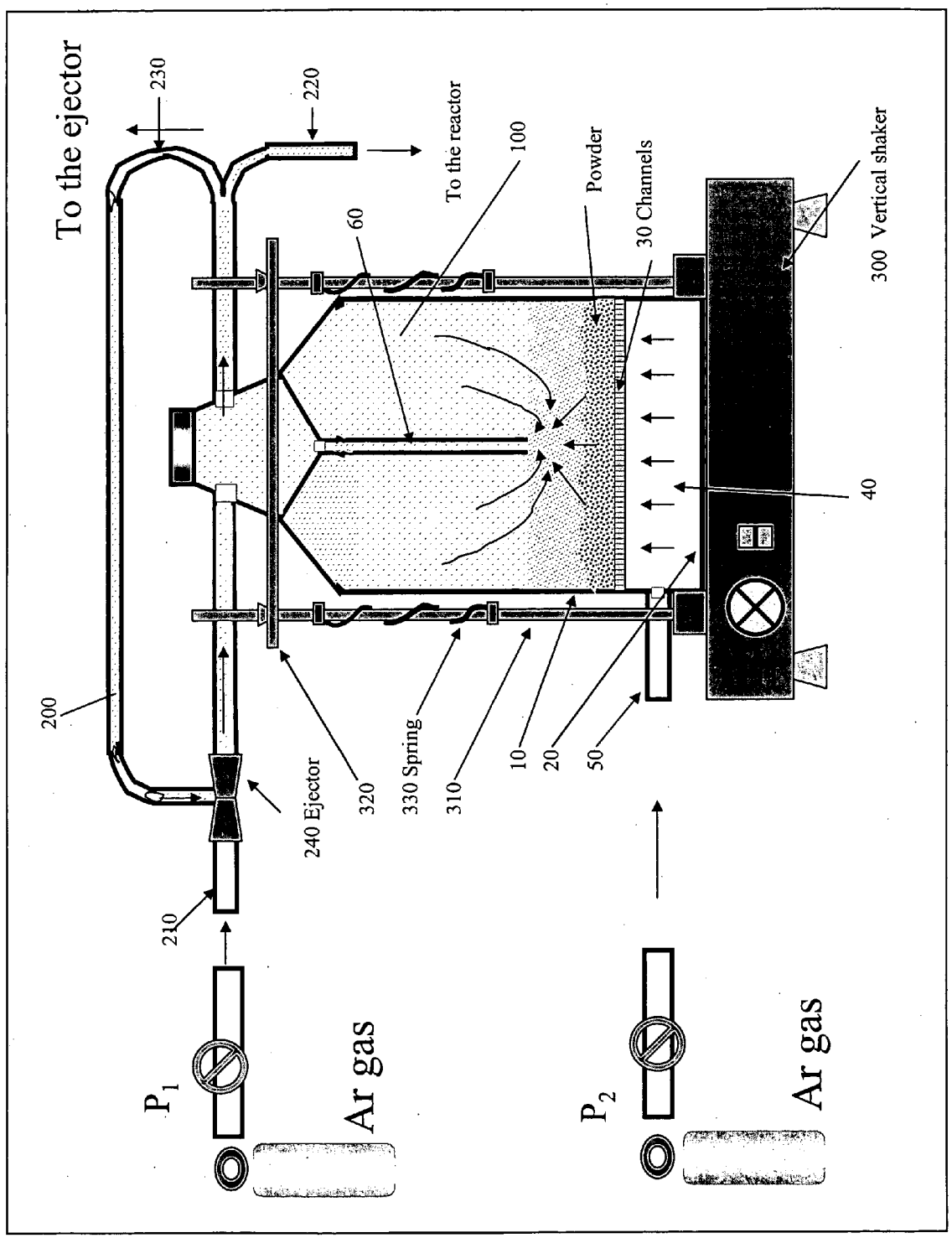

DRY POWDER INJECTOR

FIELD OF INVENTION

The present invention relates to aerosol generation of finely divided particles. Included in the invention are apparatuses and methods of producing and using such aerosols.

BACKGROUND

Aerosol generation systems are used in industry for injecting powders into tubes for pneumatic transport; in toxicology and industrial hygiene for generating study atmospheres; and in medicine for delivering particulate drugs to patients by the inhalation route. Several types of generators are commercially available, including: the Venturi tube powder injector, which utilizes pressurized air (Bohnet M., Calculation and design of gas/solid injectors. Powder Technology, 302–313, 1984; Cheng, Y., Barr et al., "A Venturi dispenser as a dry powder generator for inhalation studies," Inhalation Toxicology 1: 365–371, 1989), the Wright dust feeder, which uses a rotating scraper, (Wright, B., "A new dust-feed mechanism," Journal of Scientific Instruments, 27: 12–15, 1950) and various fluidized bed designs, which use blowing air (Drew, R. and Laskin, S., "A new dust-generating system for inhalation studies," American Industrial Hygiene Association Journal, 32: 327–330, 1971; Ebens R. and Vos, M. "A device for the continuous metering of small dust quantities," Staub-Reinhalt der Luft, 28(5): 24–25, 1971).

Typically, a jet pump or ejector is used to aspirate powder from a powder container or hopper and to transfer the powder through an outlet conduit to a spray device (U.S. Pat. No. 5,056,720). The powder can be supplied from a fluidized bed (U.S. Pat. No. 3,746,254). In order to meter or control the rate of flow of powder from the powder source, such pumps conventionally include a metering air flow that injects a controlled flow of air into the powder supply. The pressure of this metering air flow controls the amount of air which is mixed with the powder entering the pump. Consequently, if the metering air flow pressure is increased, the amount of air in the powder-air mixture is increased and therefore the net powder flow rate is decreased. Conversely, if the metering air flow pressure is decreased, the amount of air in the powder-air mixture is decreased and therefore the net flow rate of powder is increased.

One of the shortcomings of these powder delivery systems is that the powder ejected normally flows unevenly to the target. There are periodic puffs or clouds of powder delivered and periodic reductions in the density of powder delivered. Such periodic increases or decreases in powder density result in uneven application of powder to the target, which are not desirable. Thus the ability to control the flow rate of the powder is very important in order to deliver the powder smoothly without surging or pulsing effects; to control the velocity at which the powder is delivered; and to insure that the air entrained powder is well dispersed in the air stream before reaching the target, such as a reaction chamber for the production of carbon nanotubes. Thus, there is a need for methods for delivering powders in a controlled manner.

SUMMARY

The present invention provides methods, apparatuses, and processes for the large scale continuous production of carbon nanostructures, such as single-walled carbon nanotubes.

In one aspect, metal particles having controlled particle size and/or diameter are supported on non-carbon containing powdered oxide supports. The resulting metal nanoparticles are used as a growth catalyst for the growth of carbon nanotubes. The supported metal nanoparticles are entrained in a gas and delivered into the reaction chamber as an aerosol.

In one aspect, the invention provides an apparatus for injecting dry powder. The apparatus comprising a container; a means of creating an aerosol of the dry powder within the container; a conduit at the upper portion of the container having an inlet end and a discharge end, wherein the inlet end comprises an ejector and introduces a pressurized gas into the container and the discharge end is bifurcated wherein one portion connects to the ejector and the other portion discharges the aerosol of the powder; and a shaker for shaking the container vertically. The ejector is located in between the gas source and the top portion of the container, the ratio of diameter of the ejector to the inlet is about 0.25 to about 0.9, and may vary.

These and other aspects of the present invention will become evident upon reference to the following detailed description. In addition, various references are set forth herein which describe in more detail certain procedures or compositions, and are therefore incorporated by reference in their entirety.

BRIEF DESCRIPTION OF DRAWINGS

FIG. 1 illustrates the injector of the present invention.

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry $3^{rd}$ Ed." Vols. A and B, Plenum Press, New York, and Cotton et al. (1999) "Advanced Inorganic Chemistry $6^{th}$ Ed." Wiley, New York.

The terms "metalorganic" or "organometallic" are used interchangeably and refer to co-ordination compounds of organic compounds and a metal, a transition metal or metal halide.

The term "passivating solvent" as used herein refers to an organic solvent that will not co-ordinate with the metal ions, and that is suitable for use in thermal decomposition reactions.

The term "halogen" as used herein refers to fluoro, bromo, chloro and/or iodo.

The term "lower alkoxy" refers to the oxides of lower alkyl groups. Examples of lower alkyl groups include, but are not limited to, methyl, ethyl, propyl, isopropyl, butyl, isobutyl, sec-butyl, tert-butyl, pentyl, n-hexyl, octyl, dodecyl, and the like. The oxides includes methoxide, ethoxide, butoxide, and the like.

The present invention discloses methods, apparatus, and processes for the delivery of aerosolized powders, such as catalysts supported on solids.

II. The Injector

An injector of the invention is illustrated in FIG. 1. The injector comprises a container for the powder, a conduit structure attached to the container that allows the powder to be drawn from the container and directed towards the reactor, and a vibrator capable of shaking the container in a vertical direction. The container may be, for example, a bottle, a flask, a shipping box, a barrel, a fluidizing hopper, and the like, and can be made from any material, such as glass, plastic, ceramic, or metal. The components for the delivery system of gas flow can be connected together using standard ½ inch stainless steel tubing or glass tubing. Conventional gas sources, such as pressurized canisters with pressure regulators, can be used for gas sources. The amount of gas delivered to the inlets typically can be controlled using standard mass flow controllers that are commercially available.

The container comprises a porous plate that is permeable to gas, especially pressurized gas, such as argon, helium, hydrogen, or air. The air flows upwards through the porous plate in the form of many fine jets fluidizing the powder contained above the intermediate bottom, so that the powder particles float or hover in the air flow, thereby providing the fluidized powder. The fluidizing action of the pressurized gas directed through the porous plate allows the powder to be drawn through the conduit structure and directed towards the attached reactor.

Referring to FIG. 1, the container 100 comprises a conventional container having side walls 10 and a bottom wall 20. Spaced upwardly from the bottom wall there is a gas pervious porous plate 30 which extends between the side walls and is secured thereto. This porous plate 30, the parallel bottom wall 20, and the side walls define an air chamber 40 into which high pressure air, such as argon, can be introduced from a source through a side wall fitting 50. This high pressure air passes from the air chamber 40 upwardly through the porous plate 30 to fluidize the powder placed in the container 100.

The fluidized powder is collected through a tube 60 that extends from the top of the container to a position above the powder. The length of the tube 60 and its diameter can be varied so that the desired concentration of the fluidized powder is obtained.

The top part of the container comprises a conduit structure 200 that permits the fluidized powder to be drawn from the container and directed towards the reactor. The conduit can typically be made from a tube, such as a glass or Pyrex® tube. The conduit has two ends, an inlet end and a discharge end. At the inlet end 210, the conduit can be attached a high pressure air source that is capable of introducing air into the top portion of the container. The discharge end of the conduit is bifurcated wherein one portion can be the exit 220 for the aerosolized dry powder, such as into a reactor, while the other portion 230 is connected back to the part of the tube in between the gas source and the container and at the ejector 240. The ejector 240 can be located at any point in between the gas source and the container. At the ejector, the diameter of the tube decreases such that the ratio of the diameter of the ejector to the diameter of the inlet can be about 0.25 to about 0.9. The diameter of the ejector depends on the amount of the powders required in the reactor, on the flow rate of the transport Ar gas and also on the flow rate of the Ar gas responsible for fluidizing the powder in the container. Dependence on the experimental requirements the ratio of the diameter of the ejector to the diameter of the inlet can be vary in the wide region e.g. about 75% to about 30% of the diameter of the tube.

The compressed gas fluidizes the powder in the container not across the entire container cross section, but only in the limited area of the channels. During fluidization of the powder there is created at the channels a cavity into which powder slides continuously from the container. This sliding, continuous filling of the cavity, and fluidization can be improved by shaking the container by means of a vibrator. Preferably, the vibrator is a vertical shaker 300 (model # 9816, Union Scientific Corporation, Randallstown, Md. 21133, USA). Typically, the container 100 is placed on a vibrator having two or more vertical bars 310 that enclose the container, and a top horizontal bar 320 that spans across the vertical bars 310 and the top part of the container. A spring 330 can be placed on one or all of the vertical bars. As illustrated in FIG. 1, the spring 330 is preferably placed immediately below the horizontal bar 320. The spring can be made from any material, such as steel, copper, and the like. The size and tensile strength of the spring can vary depending on the overall weight that needs to be shaken, and can be determined easily by one of skill in the art. The container is moved in an up and down direction during operation using a magnet. Typical amplitude of vibration is ~0.5 mm.

During operation, particles of about 20 $m^2/g$ to about 150 $m^2/g$ are placed on the gas pervious plate. Gas, such as argon gas, is passed though the powder at a rate of about 2 Lpm to about 20 Lpm to aerosolize the particles. Concurrently, gas, such as argon gas, is passed through the conduit structure atop the container at a rate of about 1 Lpm to about 20 Lpm to transport the aerosolized powder to the reactor. The gas flow through the conduit can be adjusted to deliver from 0.1 $g/m^3$ to about 200 $g/m^3$ of the aerosolized particles to the reactor. The concentration of the aerosolized particles entrained in the gas can be adjusted to meet the requirements of the experiment. Thus, a concentration of about 1 $g/m^3$ to about 150 $g/m^3$, preferably about 5 $g/m^3$ to 100 $g/m^3$, or a concentration about 200 $g/m^3$ can be delivered as required.

III. The Catalyst

The method, processes, and apparatuses of the present invention use metal nanoparticles as the metallic catalyst. The metal or combination of metals selected as the catalyst can be processed to obtain the desired particle size and diameter distribution. The metal nanoparticles can then be separated by being supported on a material suitable for use as a support during synthesis of carbon nanotubes using the metal growth catalysts described below. Such materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. The metal nanoparticles on the support powders are injected as an aerosol into the reaction vessel. The function of the metallic catalyst in the carbon nanotube growth process is to decompose the carbon precursors and aid the deposition of ordered carbon as nanotubes The metal catalyst can be selected from a Group V metal, such as V, Nb, or Ta and mixtures thereof, a Group VI metal including Cr, W, Mo, or U and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Hg, Sc, Y, or La and mixtures thereof. Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Ir—W, Ir—Mo, Pt—Cr, Pt—W, and Pt—Mo. Preferably, the metal catalyst is iron, cobalt, nickel, molybdeum, or a mixture thereof, such as Fe—Mo, Co—Mo and Ni—Fe—Mo.

The metal, bimetal, or combination of metals are used to prepare metal nanoparticles having defined particle size and diameter distribution. The metal nanoparticles can be prepared by thermal decomposition of the corresponding metal salt added to a passivating salt, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. Metal nanoparticles having particle size of about 0.1 nm to about 100 nm, preferably about 1 nm to about 20 nm, more preferably about 2 nm to about 11 nm and most preferably about 3 nm to 7 nm can be prepared. The metal nanoparticles can thus have a particle size of 2, 3, 4, 5, 6, 7, 8, 9, or 10 nm, and up to about 20 nm. In another aspect, the metal nanoparticles can have a range of particle sizes. For example, the metal nanoparticles can have particle sizes in the range of about 3 nm and about 7 nm in size, about 5 nm and about 10 nm in size, or about 8 nm and about 16 nm in size. The metal nanoparticles can optionally have a diameter distribution of about 0.5 nm to about 20 nm, preferably about 1 nm to about 15 nm, more preferably about 1 nm to about 5 nm. Thus, the metal nanoparticles can have a diameter distribution of about 1, 2, 3, 4, 5, 6, 7, 8, 9, 10, 11, 12, 13, 14, or 15 nm.

The metal salt can be any salt of the metal, and can be selected such that the melting point of the metal salt is lower than the boiling point of the passivating solvent. Thus, the metal salt contains the metal ion and a counter ion, where the counter ion can be nitrate, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof. The melting point of the metal salt is preferably about 5° C. to 50° C. lower than the boiling point, more preferably about 5° C. to about 20° C. lower than the boiling point of the passivating solvent.

The metal salt can be dissolved in a passivating solvent to give a solution, a suspension, or a dispersion. The solvent is preferably an organic solvent, and can be one in which the chosen metal salt is relatively soluble and stable, and where the solvent has a high enough vapor pressure that it can be easily evaporated under experimental conditions. The solvent can be an ether, such as a glycol ether, 2-(2-butoxyethoxy)ethanol, $H(OCH_2CH_2)_2O(CH_2)_3CH_3$, which will be referred to below using the common name dietheylene glycol mono-n-butyl ether, and the like.

The relative amounts of metal salt and passivating solvent are factors in controlling the size of nanoparticles produced. A wide range of molar ratios, here referring to total moles of metal salt per mole of passivating solvent, can be used for forming the metal nanoparticles. Typical molar ratios of metal salt to passivating solvent include ratios as low as about 0.0222 (1:45), or as high as about 2.0 (2:1), or any ratio in between. Thus, for example, about $5.75 \times 10^{-5}$ to about $1.73 \times 10^{-3}$ moles (10–300 mg) of $FeAc_2$ can be dissolved in about $3 \times 10^{-4}$ to about $3 \times 10^{-3}$ moles (50–500 ml) of diethylene glycol mono-n-butyl ether.

In another aspect, more than one metal salt can be added to the reaction vessel in order to form metal nanoparticles composed of two or more metals, where the counter ion can be the same or can be different. The relative amounts of each metal salt used can be a factor in controlling the composition of the resulting metal nanoparticles. For the bimetals, the molar ratio of the first metal salt to the second metal salt can be about 1:10 to about 10:1, preferably about 2:1 to about 1:2, or more preferably about 1.5:1 to about 1:1.5, or any ratio in between. Thus, for example, the molar ratio of iron acetate to nickel acetate can be 1:2, 1:1.5, 1.5:1, or 1:1. Those skilled in the art will recognize that other combinations of metal salts and other molar ratios of a first metal salt relative to a second metal salt may be used in order to synthesize metal nanoparticles with various compositions.

The passivating solvent and the metal salt reaction solution can be mixed to give a homogeneous solution, suspension, or dispersion. The reaction solution can be mixed using standard laboratory stirrers, mixtures, sonicators, and the like, optionally with heating. The homogenous mixture thus obtained can be subjected to thermal decomposition in order to form the metal nanoparticles.

The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner, and the heating can be under reflux. The length of the thermal decomposition can be selected such that the desired size of the metal nanoparticles can be obtained. Typical reaction times can be from about 10 minutes to about 120 minutes, or any integer in between. The thermal decomposition reaction is stopped at the desired time by reducing the temperature of the contents of the reaction vessel to a temperature below the melting point of the metal salt.

The size and distribution of metal nanoparticles produced can be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

The metal nanoparticles, such as those formed by thermal decomposition described in detail above, can then be supported on solid supports. The solid support can be silica, alumina, MCM-41, MgO, $ZrO_2$, aluminum-stabilized magnesium oxide, zeolites, or other oxidic supports known in the art, and combinations thereof. For example, $Al_2O_3$—$SiO_2$ hybrid support could be used. Preferably, the support is aluminum oxide ($Al_2O_3$) or silica ($SiO_2$). The oxide used as solid support can be powdered thereby providing small particle sizes and large surface areas. The powdered oxide can preferably have a particle size between about 0.01 μm to about 100 μm, more preferably about 0.1 μm to about 10 μm, even more preferably about 0.5 μm to about 5 μm, and most preferably about 1 μm to about 2 μm. The powdered oxide can have a surface area of about 50 to about 100 $m^2/g$, more preferably a surface area of about 200 to about 800 m²/g. The powdered oxide can be freshly prepared or commercially available.

In one aspect, the metal nanoparticles are supported on solid supports via secondary dispersion and extraction. Secondary dispersion begins by introducing particles of a powdered oxide, such as aluminum oxide ($Al_2O_3$) or silica ($SiO_2$), into the reaction vessel after the thermal decomposition reaction. A suitable $Al_2O_3$ powder with 1–2 μm particle size and having a surface area of 300–500 m²/g is commercially available from Alfa Aesar of Ward Hill, Mass., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution.

The mixture of powdered oxide and the metal nanoparticle/passivating solvent mixture can be mixed to form a homogenous solution, suspension or dispersion. The homogenous solution, suspension or dispersion can be formed using sonicator, a standard laboratory stirrer, a mechanical mixer, or any other suitable method, optionally with heating. For example, the mixture of metal nanoparticles, powdered oxide, and passivating solvent can be first sonicated at roughly 80° C. for 2 hours, and then sonicated and mixed with a laboratory stirrer at 80° C. for 30 minutes to provide a homogenous solution.

After secondary dispersion, the dispersed metal nanoparticles and powdered oxide can be extracted from the passivating solvent. The extraction can be by filtration, centrifugation, removal of the solvents under reduced pressure, removal of the solvents under atmospheric pressure, and the like. For example, extraction includes heating the homogenized mixture to a temperature where the passivating solvent has a significant vapor pressure. This temperature can be maintained until the passivating solvent evaporates, leaving behind the metal nanoparticles deposited in the pores of the $Al_2O_3$. For example, if diethylene glycol mono-n-butyl ether as the passivating solvent, the homogenous dispersion can be heated to 231° C., the boiling point of the passivating solvent, under an $N_2$ flow. The temperature and $N_2$ flow are maintained until the passivating solvent is completely evaporated. After evaporating the passivating solvent, the powdered oxide and metal nanoparticles are left behind on the walls of the reaction vessel as a film or residue. When the powdered oxide is $Al_2O_3$, the film will typically be black. The metal nanoparticle and powdered oxide film can be removed from the reaction vessel and ground to create a fine powder, thereby increasing the available surface area of the mixture. The mixture can be ground with a mortar and pestle, by a commercially available mechanical grinder, or by any other methods of increasing the surface area of the mixture will be apparent to those of skill. in the art.

Without being bound by any particular theory, it is believed that the powdered oxide serves two functions during the extraction process. The powdered oxides are porous and have high surface area. Therefore, the metal nanoparticles will settle in the pores of the powdered oxide during secondary dispersion. Settling in the pores of the powdered oxide physically separates the metal nanoparticles from each other, thereby preventing agglomeration of the metal nanoparticles during extraction. This effect is complemented by the amount of powdered oxide used. As noted above, the weight ratio of metal nanoparticles to powdered oxide can be between about 1:10 and 1:15. The relatively larger amount of powdered oxide in effect serves to further separate or 'dilute' the metal nanoparticles as the passivating solvent is removed. The process thus provides metal nanoparticles of defined particle size.

As will be apparent to those of skill in the art, the catalyst thus prepared can be stored for later use. In another aspect, the metal nanoparticles can be previously prepared, isolated from the passivating solvent, and purified, and then added to a powdered oxide in a suitable volume of the same or different passivating solvent. The metal nanoparticles and powdered oxide can be homogenously dispersed, extracted from the passivating solvent, and processed to increase the effective surface area as described above. Other methods for preparing the metal nanoparticle and powdered oxide mixture will be apparent to those skilled in the art.

The metal nanoparticles thus formed can be used as a growth catalyst for synthesis of carbon nanotubes, nanofibers, and other one-dimensional carbon nanostructures by a chemical vapor deposition (CVD) process.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Catalysts were prepared by impregnating support materials in metal salt solutions. For the single metallic iron based catalyst, $FeAc_2$ in methanol was used at a molar ratio of $Fe:Al_2O_3$ of 1:15. Under a nitrogen atmosphere, $FeAc_2$ was added to dietheylene glycol mono-n-butyl ether in the molar ratio of 1 mM:20 mM. The reaction mixture was mixed under the nitrogen atmosphere using a magnetic stir bar, and heated under reflux for 90 minutes. The reaction mixture was then cooled to room temperature, and $Al_2O_3$ (15 mM) was added at once. The reaction solution was stirred at room temperature for 15 minutes, and then heated to 150° C. for 3 hours. The reaction was cooled to 90° C. while flowing a stream of $N_2$ over the mixture to remove the solvent. A black film formed on the walls of the reaction flask. The black film was collected and ground with an agate mortar to obtain a fine black powder.

Example 2

Synthesis of Carbon Nanotubes

About 10 g of the $Al_2O_3$-supported iron catalyst prepared in Example 1 was placed on the porous plate in the particle injector mounted on a vertical shaker. The catalyst was aerosolized by passing argon through the bottom of the container and through the channels (FIG. 1) at a flow rate of 15 Lpm, while the injector was vertically shaken. Then, argon at a flow rate of 10 Lpm was passed through the conduit. The argon flow with the entrained particles is passed is bifurcated with one portion returning to the ejector and the other portion passing to the reactor. The catalyst, at a mass concentration of about 150 g/m³ entrained in argon is passed through a flexible tube that is wrapped around a central heating coil that serves as the pre-heater. The preheater was set for 600° C. The pre-heated argon flow with the entrained particles was then passed into the reaction chamber for producing carbon nanotubes.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference

We claim:

1. An apparatus for injecting dry powder, the apparatus comprising;
   a first end;
   an end opposite;
   an ejector located between the first end and the end opposite; and
   a container comprising means of creating an aerosol of the dry aerosolized dry powder located between the ejector and the end opposite wherein the container is shaken vertically using a shaker comprises a vibrator, two or more vertical bars extending upwards from the vibrator, a horizontal bar in between the vertical bars, and a spring on one or more of the vertical bars, wherein the container is placed on top of the vibrator and in between the vertical bars, and the spring acts to shake the container vertically, and
   wherein pressured gas is introduced through the first end, and the end opposite is bifurcated wherein one portion discharges the aerosolized powder and other portion loops back and connects to the ejector.

2. The apparatus of claim 1, wherein the first end comprises a tube.

3. The apparatus of claim 2, wherein the tube is composed of a material selected from the group consisting of glass, plastic, ceramic, and metal.

4. The apparatus of claim 2, wherein ratio of diameter of the tube to the ejector is about 1.1 to about 4.

5. The apparatus of claim 4, wherein the ratio is about 1.6 to about 2.5

6. An apparatus for injecting dry powder comprising:
   a container;
   means for creating an aerosol of the dry powder within the container;
   a conduit at the upper portion of the container having an inlet end and a discharge end, wherein the inlet end comprises an ejector and introduces a pressurized gas into the container and the discharge end is bifurcated wherein one portion connects to the ejector and other portion discharges the aerosol of the powder; and
   a shaker for shaking the container vertically, wherein the shaker comprises a vibrator, two or more vertical bars extending upwards from the vibrator, a horizontal bar in between the vertical bars, and a spring on one or more of the vertical bars, wherein the container is placed on top of the vibrator and in between the vertical bars.

7. The apparatus of claim 6, wherein the pressurized gas is helium or argon.

8. The apparatus of claim 6, wherein the ratio of diameter of the ejector to the inlet is about 0.25 to about 0.9.

9. The apparatus of claim 8, wherein the ratio is about 0.4 to about 0.6.

10. The apparatus of claim 6, wherein the dry powder comprises a metal catalyst supported on a powdered oxide substrate wherein the powdered oxide substrate has a particle size of 0.5 μm to 5 μm.

11. The apparatus of claim 6, wherein the spring is located immediately below the horizontal bar.

* * * * *